United States Patent
Lange et al.

(10) Patent No.: US 7,060,957 B2
(45) Date of Patent: Jun. 13, 2006

(54) DEVICE AND METHOD FOR SPATIALLY RESOLVED PHOTODETECTION AND DEMODULATION OF MODULATED ELECTROMAGNETIC WAVES

(75) Inventors: Robert Lange, Zürich (CH); Peter Seitz, Urdorf (CH)

(73) Assignee: CSEM Centre Suisse d'Electronique et Microtechinique SA, Neuchatel (CH)

( * ) Notice: Subject to any disclaimer, the term of this patent is extended or adjusted under 35 U.S.C. 154(b) by 284 days.

(21) Appl. No.: 10/258,784

(22) PCT Filed: Mar. 26, 2001

(86) PCT No.: PCT/CH01/00184

§ 371 (c)(1),
(2), (4) Date: Dec. 9, 2002

(87) PCT Pub. No.: WO01/84182

PCT Pub. Date: Nov. 8, 2001

(65) Prior Publication Data

US 2004/0008394 A1    Jan. 15, 2004

(30) Foreign Application Priority Data

Apr. 28, 2000  (EP) .................................. 00109271

(51) Int. Cl.
*G02B 5/04*   (2006.01)

(52) U.S. Cl. .................................................. 250/208.1

(58) Field of Classification Search ............. 250/208.1; 359/615; 356/3.08
See application file for complete search history.

(56) References Cited

U.S. PATENT DOCUMENTS 4,796,997 A    1/1989  Svetkoff et al.

(Continued)

FOREIGN PATENT DOCUMENTS

DE    44 40 613 C1   7/1996

(Continued)

OTHER PUBLICATIONS

WO 97/26761, Improved Three-Dimensional Imaging System, Publication Date: Jul. 24, 1997.

*Primary Examiner*—David Porta
*Assistant Examiner*—Tony Ko
(74) *Attorney, Agent, or Firm*—Rankin, Hill, Porter & Clark LLP

(57) ABSTRACT

A device and method for spatially resolved photodetection and demodulation of temporally modulated electromagnetic waves makes it possible to measure phase, amplitude and offset of a temporally modulated, spatially coded radiation field. A micro-optical element (41) spatially averages a portion (30) of the scene and equally distributes the averaged intensity on two photo sites (51.1.51.2) close to each other. Adjacent to each of these photo sites (51.1) are two storage areas (54.1, 54.2) into which charge from the photo site can be moved quickly (with a speed of several MHz to several tens or even hundreds of MHz) and accumulated essentially free of noise. This is possible by employing the charge-coupled device (CCD) principle. The device combines a high optical fill factor, insensitivity to offset errors, high sensitivity even with little light, simultaneous data acquisition, small pixel size, and maximum efficiency in use of available signal photons for sinusoidal as well as pulsed radiation signals. The device and method may be used in a time-of-flight (TOF) range imaging system without moving parts, offering 2D or 3D range data.

8 Claims, 10 Drawing Sheets

U.S. PATENT DOCUMENTS

| | | | |
|---|---|---|---|
| 4,915,498 A | | 4/1990 | Malek |
| 5,497,269 A | * | 3/1996 | Gal .......................... 359/615 |
| 5,837,993 A | * | 11/1998 | Philippe .................. 250/208.1 |
| 5,850,282 A | * | 12/1998 | Egawa ...................... 356/3.08 |

FOREIGN PATENT DOCUMENTS

| | | |
|---|---|---|
| DE | 197 04 496 A1 | 3/1998 |
| DE | 198 21 974 A1 | 11/1999 |

* cited by examiner

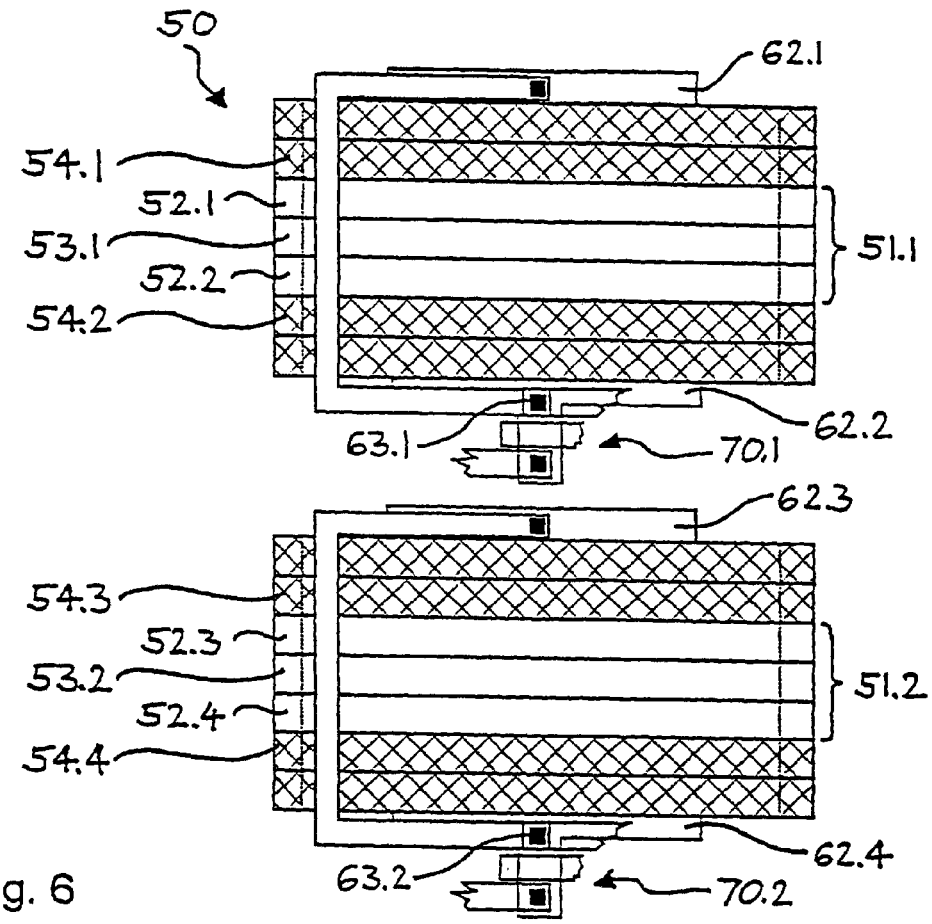
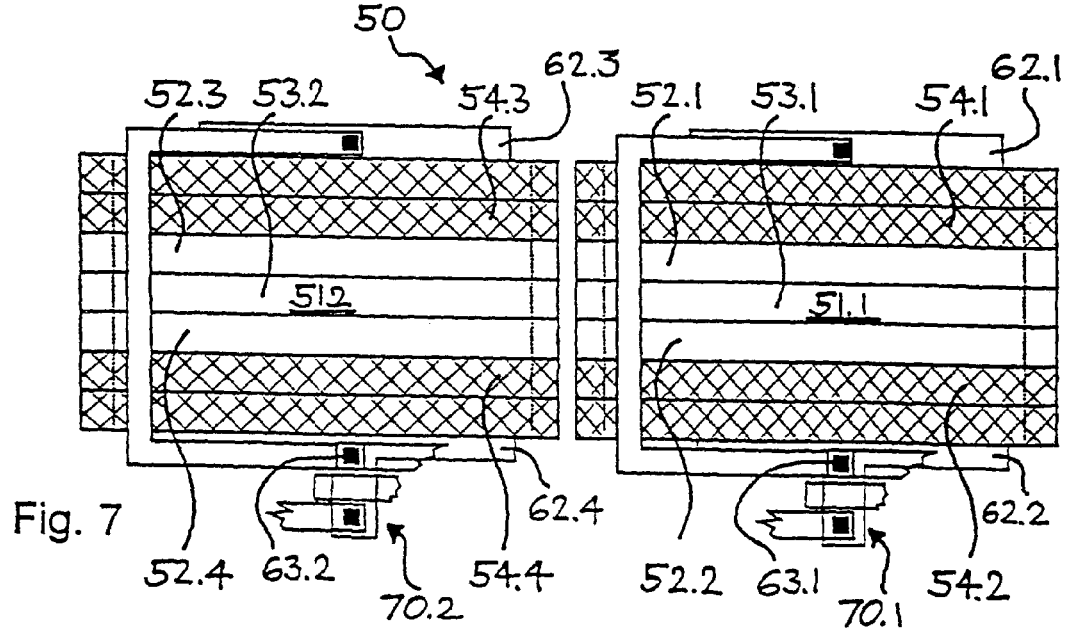
Fig. 6
Fig. 7

DEVICE AND METHOD FOR SPATIALLY RESOLVED PHOTODETECTION AND DEMODULATION OF MODULATED ELECTROMAGNETIC WAVES

FIELD OF THE INVENTION

The invention relates to a 1-dimensional (1D) or 2-dimensional (2D) device and a method for spatially resolved photodetection and demodulation of temporally modulated electromagnetic waves. It makes possible to measure phase, amplitude and offset of a temporally modulated, spatially coded radiation field. Preferential use of the invention is in a time-of-flight (TOF) range imaging system without moving parts, offering 2D or 3D range data. Such a range camera can be used in machine vision, surveillance, all kinds of safety applications, automated navigation and multimedia applications. The invention is especially useful in distance-measurement applications where high distance accuracy is necessary also for objects far away from the measurement system, in particular applications that need a distance accuracy independent from the target distance.

In this document, the term "light" stands for any electromagnetic radiation, and preferably for visible, ultra-violet or infra-red radiation.

BACKGROUND OF THE INVENTION

German patent DE-44 40 613 C1 discloses a one- or two-dimensional array of demodulation pixels. One pixel contains one single photo site (photo diode or CCD gate), which is connected to one or more light-protected storage sites (realized as CCD pixel or MOS capacitor) by electrical switches (realized as CCD transfer gate or as transistor switch). The photo site integrates charge that is generated by incoming light. After this short-time integration the photo charge is transferred into a storage site by activating a switch. If realized in CCD technology, this charge addition can be performed repetitively. For a demodulation application the integration time is chosen to be much shorter than the period of the modulation signal. Thus, the device can be used to sample the incoming modulated signal fast enough such that no temporal aliasing takes place.

Practical realizations known so far always used the CCD principle to realize the photo site, the electrical switch and the storage sites. To connect one photo gate to several storage gates by more than one transfer gate (electrical switch) always occupies space. With today's technologies, accessing the photo site, for example by four transfer gates, forces to realize relatively large photo gates. Charge transfer from the photo site to the storage site (response/efficiency of the switch) is then relatively poor and slow. Additionally, practice shows that it is very difficult to realize four transfer gates with equal transfer efficiencies. Therefore, current realizations suffer from inhomogeneities between the single switch/storage combinations at practical frequencies needed for time-of-flight (TOF) applications (>1 MHz). These effects lead to the fact that with today's technologies the teaching of DE-44 40 613 C1 can only be used for TOF applications when realized or operated as one-switch-one-storage-site-device and a special operation mode: it has to be operated such that the sampling points are acquired temporally serially rather than in parallel. This is a serious restriction if TOF-measurements have to be performed of fast-changing scenes containing moving objects.

German patent application DE-197 04 496 A1 describes a similar pixel structure consisting of at least two modulation photo gates (MPG) and dedicated accumulation gates (AG). An MPG pair is always operated in a balanced mode (as balanced modulator). The charge carriers are optically generated in the depletion region underneath the MPGs by the incoming modulated light and guided to the accumulation gates by a potential gradient. This potential gradient depends on the control signals applied to the MPGs.

DE-197 04 496 A1 includes a pixel realization with only one MPG pair operated sequentially with two phases relative to the phase of the modulated transmitter and thus enabling the measurement of the received light's time delay. As in practical realization of DE-44 40 613 C1, this serial acquisition of an "in-phase" and "quadrature-phase" signal represents a serious drawback when being used for TOF applications with fast-changing scenes.

Additionally, DE-197 04 496 A1 suggests a realization with four MPGs and four AGs, where always two MPGs build a balanced modulation pair, and both pairs are operated with different phase with respect to each other. In that way, four phase-measurements (sampling points) of the incoming light can be measured in parallel. This access to the light sensitive area from four local different places again, as is the case in DE-44 40 613 C1, results in a non-uniform charge distribution and gives each accumulation gate a different offset, which is complicated to compensate. DE-197 04 496 A1 suggests two different possibilities:

(i) The AGs are realized as CCD gates. Then the charge carriers can be integrated under the AGs and read out by a multiplex structure, for example a CCD, after an integration period.

(ii) Alternatively, instead of integrating the charge the AGs can be realized directly as pn-diodes and the signal can be read out as voltage or current (for example with an APS structure), or these signals directly feed a post-processing structure to measure phase and total intensity.

Such a post-processing APS-structure, however, occupies space on the sensor and will always drastically increase the sensor's pixel size and, hence, decrease its fill factor. Additionally, feeding the generated photocurrent directly to an amplification stage before being integrated, adds additional noise sources to the signal and decreases the structure's performance, especially for low-power optical input signals.

German patent application DE-198 21 974 A1 is based on DE-197 04 496 A1. Here some special dimensions and arrangements of the MPGs are suggested. The MPGs are implemented as long and small stripes with gate widths of magnitude of the illumination wavelength and gate lengths of 10 to 50 times this magnitude. Several parallel MPG-AG-pairs form one pixel element. All MPG-AG pairs within one pixel element are operated with the same balanced demodulation-control signal. All AGs are properly connected to a pair of readout wires, which feeds a post-processing circuit for the generation of sum and difference current. One pixel consists of one or more pixel elements, where each pixel element consists of several pairs of MPGs. If one pixel is realized with several pixel elements, the teaching of DE-198 21 974 A1 intends to operate the pixel elements in different phase relations, in particular with a phase difference of 90° (in-phase and quadrature-phase measurement in different pixel-elements). Additionally, DE-198 21 974 A1 recommends the use of microlenses or stripe-lenses to focus the light only onto the (light sensitive) MPGs. These optical structures, however, do not correct for local inhomogeneities in the scene detail imaged to one pixel. Such inhomogeneities, especially to be expected due to the large pixel size, lead to measurement errors. This is because the in-phase pixel elements acquire another part of the scene than the quadrature-phase pixel elements.

The main drawback of DE-198 21 974 A1 is the targeted (relatively large) pixel size between 50×50 µm² to 500×500 µm². It is therefore not suited to be realized as a larger array of many 10,000 of pixels. The reason for the described long and narrow MPGs is the need for small transportation distances of the photo-generated charge carriers into the AGs. Only for small distances, the structure can be used for demodulation of high modulation frequencies (increased bandwidth). If the MPGs were realized with MPGs of small length and width, the photosensitive area of each pixel would be very small with respect to the planned space-consuming in-pixel post-processing circuitry. Realizing several long-length and short-width modulation structures and arranging and operating them in parallel and thus increasing the photosensitive area without losing bandwidth (due to small drift ways for the charge carriers) is an elegant way of increasing the optical fill-factor. However, the increased fill factor can only be realized with larger pixels and hence the total number of pixels, which can be realized in an array, is seriously limited with the device described in this prior-art document.

TOF distance measurement systems always use active illumination of the scene. A modulated light source is normally located near the detector. Since the optical power density on the illuminated object or target decreases with the square of the distance between the illumination source and the target, the received intensity on the detector also decreases with the square of the target distance. That is why the measurement accuracy for targets far away from the sensor is worse than the accuracy for near targets.

Some known TOF systems are operated with square light pulses of constant amplitude during the pulse duration (cf. Schroeder W., Schulze S., "Laserkamera: 3D-Daten, Schnell, Robust, Flexibel", Daimler-Benz Aerospace: Raumfahrt-Infrasttuktur, 1998). The receiver is realized as or combined with a fast electrical, optical or electro-optical switch mechanism, for example an MOS switch, a photomultiplier (1D) or a microchannel plate (MCP), an image intensifier, or the "in-depth-substrate-shutter-mechanism" of special CCDs (Sankaranarayanan L. et al., "1 GHz CCD Transient Detector", IEEE ch3075-9191, 1991). Spirig's, Lange's and Schwarte's lock-in or demodulation pixels can also be used for this kind of operation (Spirig T., "Smart CCD/CMOS Based Image Sensors with Programmable, Real-time, Temporal . . . ", Diss. ETH No. 11993, Zurich, 1997; Lange R et al., "Time-of-flight range imaging with a custom solid-state image sensor", Proc. SPIE, Vol. 3823, pp. 180–191, Munich, June 1999, Lange R. et al., "Demodulation pixels in CCD and CMOS technologies for time-of-flight ranging", Proc. SPIE, Vol. 3965A, San Jose, January 2000, Schwarte R, German patent application No. DE-197 04 496 A1.

With the transmission of the light pulse, the switch in the receiver opens. The switch closes with the end of the light pulse. The amount of light integrated in the receiver depends on the overlap of the time window defined by the ON time of the switch and the delayed time window of ON time of the received light pulse. Both ON time of the switch and pulse width are chosen to have the same length. Thus, targets with zero distance receive the full amount of the light pulse, the complete light pulse is integrated. Targets farther away from the light source only integrate a fraction of the light pulse. The system can only measure distances $L < L_{max}$ within the propagation range of the light pulse, defined by half the product of pulse width T and light velocity c.

The intensity of back-scattered light decreases with the square of the target's distance to the emitting active illumination source. The prior-art shutter operation leads to an additional distance-dependent attenuation of the integrated received signal:

$$\text{integrated signal} \sim \frac{(L_{max} - L)}{L^2} \cdot I_{trans}, \quad (1)$$

where $I_{trans}$ represents the transmitted light intensity;

$$L_{max} = \frac{T \cdot c}{2}. \quad (2)$$

These prior-art contents are also summarized in FIGS. 8 and 9.

In order to use this principle for performing a distance measurement, two additional measurements have to be performed: a first additional measurement without any active illumination for measuring and subtracting the background-offset, and a second additional measurement with the active illumination switched on for measuring the amplitude of the back-scattered light.

SUMMARY OF THE INVENTION

It is an object of the present invention to provide a device and a method for spatially resolved photodetection and demodulation of modulated electromagnetic waves that overcomes the above-mentioned limitations of the prior art. It is a further object of the invention to provide a device and a method for determining a distance between the device and a target.

The basic idea of the invention consists of using a micro-optical element that images the same portion of the scene on at least two photo sites close to each other. Adjacent to each of these photo sites is at least one, and preferably two, storage areas into which charge from the photo site can be moved quickly (with a speed of several MHz to several tens of or even hundreds of MHz) and accumulated essentially free of noise. This is possible by employing the charge-coupled device (CCD) principle. The device according to the invention can preferentially be operated in two modes for two types of modulated radiation fields:

Sinusoidal radiation, signals are demodulated by operating the two photo sites and their storage areas in quadrature, i.e., by applying the clocking signals to the second photo site and its storage areas with a delay of a quarter of the repetition period compared to the first photo site and its storage areas.

Pulsed radiation signals are measured by switching the first photo site's storage part from the first to the second area during the arrival of the radiation pulse. The second photo site and its storage areas are used for offset measurements without emitted and received radiation.

The device for spatially resolved photodetection and demodulation of temporally modulated electromagnetic waves according to the invention comprises a one-dimensional or two-dimensional arrangement of pixels. A pixel comprises at least two elements for transducing incident electromagnetic radiation into an electric signal, each transducer element being associated with at least one element for storing the electric signal, the at least one storage element being inaccessible or insensitive to incident electromagnetic radiation. A pixel comprises an optical element for spatially averaging the electromagnetic radiation incident on the pixel and equally distributing the averaged electromagnetic radiation onto the transducer elements of the pixel.

The method for spatially resolved photodetection and demodulation of temporally modulated electromagnetic waves according to the invention comprises the steps of
(a) impinging electromagnetic radiation onto a one-dimensional or two-dimensional arrangement of pixels,
(b) transducing electromagnetic radiation incident on a pixel into at least two electric signals in at least two transducer elements, and
(c) storing each of the at least two electric signals in at least one storage element.

Prior to step (c), the electromagnetic radiation incident on a pixel is spatially averaged and the averaged electromagnetic radiation is equally distributed onto the transducer elements of the pixel.

The device for determining a distance between the device and an object according to the invention comprises means for emitting during a first limited time interval pulsed electromagnetic radiation, means for detecting incident electromagnetic radiation during a second limited time interval, and means for controlling the emitting and detecting means such that the first and second time intervals do not overlap. The detecting means are preferably the above-described device for spatially resolved photodetection and demodulation of temporally modulated electromagnetic waves according to the invention.

The method for determining a distance between a measurement system and an object according to the invention comprises the steps of emitting during a first limited time interval a pulse of electromagnetic radiation from the measurement system towards the object, reflecting and/or scattering at least part of the electromagnetic radiation from the object, and detecting during a second limited time interval electromagnetic radiation reflected and/or scattered from the object, whereby the first and second time intervals do not overlap. For detecting, the above-described method for spatially resolved photodetection and demodulation of temporally modulated electromagnetic waves is preferably used.

The invention combines a high optical fill factor, insensitivity to offset errors, high sensitivity even with little light, simultaneous data acquisition, small pixel size, and maximum efficiency in use of available signal photons for sinusoidal as well as pulsed radiation signals.

The micro-optical elements fulfill the task of averaging the received light on each pixel and equally distributing the averaged light onto the two light-sensitive areas. This results in two optically identical photo sites per pixel and makes the measurements insensitive to edges or, generally speaking, to any spatial inhomogeneity imaged to one pixel. Due to the small pixel size and the highly parallel, simple architecture, optical microstructures can be easily realized, produced, and assembled.

A high dynamic range can be achieved by serially taking demodulation images with different integration times, i.e., long integration times for dark objects and short integration times for bright objects. Additional CCD gates for storing short-integration-time images also in each pixel can be realized, so that the sensor does not have to be completely read out between the acquisition of the short-time-integrated and the long-time-integrated images.

The pixel itself can be realized in charge-coupled-device (CCD) technology. Pixels can be arranged in large arrays (several 10,000 pixels to several 100,000 pixels), and the readout can also be performed using the CCD principle, for example with a "frame-transfer structure". Alternatively, the pixel can be realized in a complementary-metal-oxide-semiconductor (CMOS) process offering the possibility to realize small CCD structures (3 to 20 CCD gates per pixel with a charge transfer efficiency (CTE) of greater than 90% is sufficient). With such a CMOS process each pixel can get an own readout amplifier that can be accessed by an address decoder (active-pixel-sensor (APS) principle). Further below, more detailed realizations in both CCD and CMOS will be introduced. The CMOS-APS/CCD realization offers the following advantages over a pure CCD realization:

Each pixel can be addressed and read out individually. Thus regions of interest (ROI) can be defined, for example, special regions can get a different illumination time or readout at a different frame rate.

No blooming problems like with CCDs will appear. Charge of an overexposed pixel is dumped to a dump node or to the sense node and does not disturb neighboring pixels.

No smearing problems like with CCD will appear. Instead of moving the pixel charge through the entire imager, the charge is converted to a voltage within each pixel.

Instead of accessing one photo site from four or more sites each pixel now contains two photo sites. Each of these is accessed highly symmetrically from preferably two sides by CCD gates (transfer-, modulation-, or sampling-gates). Each of these sampling gates transfers charge carriers from the photo site to a dedicated storage gate resulting in, preferentially, four isolated storage sites within each pixel. Thus, the sampling points can be measured at the same time and the pixels are not restricted to the observation of slowly changing or static processes. The device according to the invention has a demodulation bandwidth for modulated radiation fields (e.g., modulated light) ranging from zero to some tens or even hundreds of MHz.

Charge carriers are repetitively added and integrated in each storage site rather than being directly fed to any post-processing electronics. This CCD charge addition ability is a nearly noise-free process and enables the system to operate with relatively low light power just by enlarging the integration times. This is an advantage over pixel realizations with in-pixel post-processing electronics.

The pixel size can be realized smaller than possible with prior art, offering a good optical fill factor (>50% even without microlens). This is possible, since storing the demodulated phase information within the pixel occupies far less space than realizing additional post-processing electronics in each pixel.

The device according to the invention can handle sinusoidally modulated radiation signals. More than two, and preferably four temporal sampling values $A_i$ (i=0, 1, 2, 3) are measured during subsequent, and possibly partially overlapping, time intervals of length, for instance, equal to T/2 (where T is the modulation period), by integrating repeatedly during the corresponding time intervals. $A_0$ and $A_2$ are measured with the first photo site, $A_1$ and $A_3$ are measured with the second photo site. The phase angle $\phi$ can be determined according to the following equation:

$$\varphi = a\tan\left(\frac{A_0 - A_2}{A_3 - A_1}\right). \tag{3}$$

The device according to the invention can also handle pulsed radiation signals. The first photo site is switched from the first storage area to the second storage area during the arrival time of the radiation pulse, so that a first part of the radiation signal is integrated into the first storage area and the rest of the radiation signal is integrated into the second storage area. Let us call the integrated signal in the first storage area $B_0$ and the signal in the second storage area $B_1$. The second photo site is employed for offset measurements in the following way: the complete signal of the radiation pulse is integrated into the first storage area of the second photo site, producing a signal $C_0$. $C_0$ equals the sum of $B_0$ and $B_1$ and therefore directly represents the intensity image. A deviation of $C_0$ from the sum of $B_0$ and $B_1$ can be used to correct for optical or electrical inhomogeneities between both photo sites in one pixel (calibration of the pixel). Afterwards, the second photo site is switched to the second storage area, and during the time in which no pulsed radiation is received, background radiation and dark current is integrated into this second storage area, producing a signal $C_1$. The ratio $$q = \frac{B_0 - C_1}{B_1 - C_1} \quad (4)$$

is a measure for the arrival time of the radiation pulse. Since neither the temporal form of the radiation pulse nor the temporal sensitivity functions of the storage areas are perfectly binary (they are rather continuous functions of time), the ratio q is in general a non-linear function of the arrival time. Therefore, it has to be calibrated with distance measurements to produce accurate distance information.

According to the invention, the following four modes of operation with pulsed radiation signals are preferably used.

(I) Inverse Shutter Operation

The easiest way of operation according to one aspect of the invention is to start the switch at the end of the light-pulse transmission or even later. For the latter case a certain distance range in front of the range camera cannot be measured, since it is outside the "integration window". The open time of the switch, however, still remains the same. This leads to the fact that targets farther away from the sensor integrate a longer period of the light pulse than objects near the range camera. Together with the attenuation of the back-scattered light from a diffusely reflecting target, which is proportional to the square of the distance (assuming a Lambert-reflecting target), the resulting integrated signal share of the light pulse now only decreases linearly with the distance of the target. This idea is illustrated in FIG. 2.

(II) Ramp Pulse Instead of Square Pulse

Using a (falling) ramp pulse instead of a square pulse and combining this operation with the "inverse shutter operation" introduced in the above section (a) results in an integrated signal which does not depend on the target's distance, only on its remission coefficient, if the target is a Lambert reflector. This is because the integration of the received linear ramp results in an integrated signal proportional to the square of the distance, if referenced to the totally received signal mean value. Since this received signal mean value has an inversely squared dependence on the signal intensity on the target, the totally integrated signal does not depend on the distance of the target. It only depends on the remission characteristics of the target. Thus, this method can also be used to measure an object's remission (if it is known being a Lambert reflector.)

Care has to be taken in the interpretation of these results. From a simplistic point of view, one might think that such a measurement would not contain any information. However, one has to consider the following facts:

The information is only gained when referencing these results to the "dark measurement" (no illumination) and to the "light measurement" (non-modulated DC illumination with the active illumination source). The result of the latter measurement depends on the distance of the object. Illuminated objects farther away from the camera are darker than those near the camera. Only with these reference measurements the distance can be calculated. The advantage is that we get a constant signal-to-noise ratio for the modulated measurement over the complete range. And, since the signal does not depend on the distance for this measurement, a special high dynamic range of the sensor is not necessary.

It is, of course, not true for a realistic scene that all surfaces exactly behave like Lambert reflectors, meaning that the light intensity decreases with the square of the object distance. So the measurement still contains information.

Calibration of the system is still necessary. The main advantage of this operation mode is a decreased need for dynamic range of the sensor. Thus, this method could also find other applications where active illumination is used to illuminate a scene and all objects should appear with the same brightness, independent from their distance to the illumination. Amongst other applications may be cited surveillance applications with active illumination (e.g., IR). In this application the camera wants to see both targets (e.g., a thief) far away from the camera and targets near the camera. With conventional target illumination, targets near the camera would lead to saturation, which means no information, if the illumination is chosen such that distant objects can be seen.

(III) Adaptation of Pulse Shape on Transfer Characteristic of Switch

Most shutter or switch mechanisms do not behave like an ideal switch. Instead, they have a typical "switch" characteristic. For instance, they do not switch in an infinitesimally short time, but have a certain "switch" time given, e.g., by a linear or quadratic response. For some devices this "shutter-efficiency" can be externally influenced and varied over time, for instance, by means of an adjustable external control voltage. These changes in sensitivity have not been considered in the descriptions done so far. A switch with linearly increasing sensitivity over time can, for example, be used in combination with a pure square pulse illumination (rather than a ramped pulse), leading to the same result as discussed in the above section (b). Also, the shape of the light pulse can be adapted to the transfer characteristics of the switch.

(IV) Adaptation of Transfer Characteristic of Switch

Not only the shape of the light pulse can be varied in order to change the dependency of integrated (gated) charge from the distance, but very often also the detector transfer characteristic can be modified. Combinations of the operation modes (a)–(d) are also possible.

The invention overcomes the limitations of the prior art in the following areas:

The three or four phase measurements (or temporal sampling points) used for demodulation of the phase information of the received signal can be performed simultaneously, i.e. in parallel, rather than sequentially.

The overall pixel size is small. This invention is therefore ideally suited for realization as a large array (several 10,000 pixels to several 100,000 pixels).

The invention offers a large fill factor of >50% (without microlenses) and of up to 100% if microlenses are used.

Two optically identical photo sites are used for in-phase and quadrature-phase signal acquisition. Therefore, the pixels are not sensitive on local scene differences within the scene detail imaged to one pixel.

Due to the simple, highly symmetrical architecture of the pixel, a very efficient realization of a microlens structure is possible, leading to up to an effective fill factor of 100%. In addition, the assembly and positioning of the microlens array becomes relatively easy because of its extension in only 1 dimension.

The invention is robust against device noise, since no active electronics is used at a point of time where the signal is low. Instead, the post-processing is performed only when the integrated signal is strong enough.

The various sampling points are offset free (or at least pair-wise offset free, depending on the realization in pure CCD or CMOS-APS/CCD technology).

A TOF system can be operated with a resolution independent of the object distance.

BRIEF DESCRIPTION OF THE DRAWINGS

The invention and, for comparison, the state of the art are described in greater detail hereinafter relative to the attached schematic drawings.

FIGS. 5–7 show three different embodiments of the invention realized in CMOS-APS/CCD technology.

DESCRIPTION OF THE PREFERRED EMBODIMENTS

Figure 1:
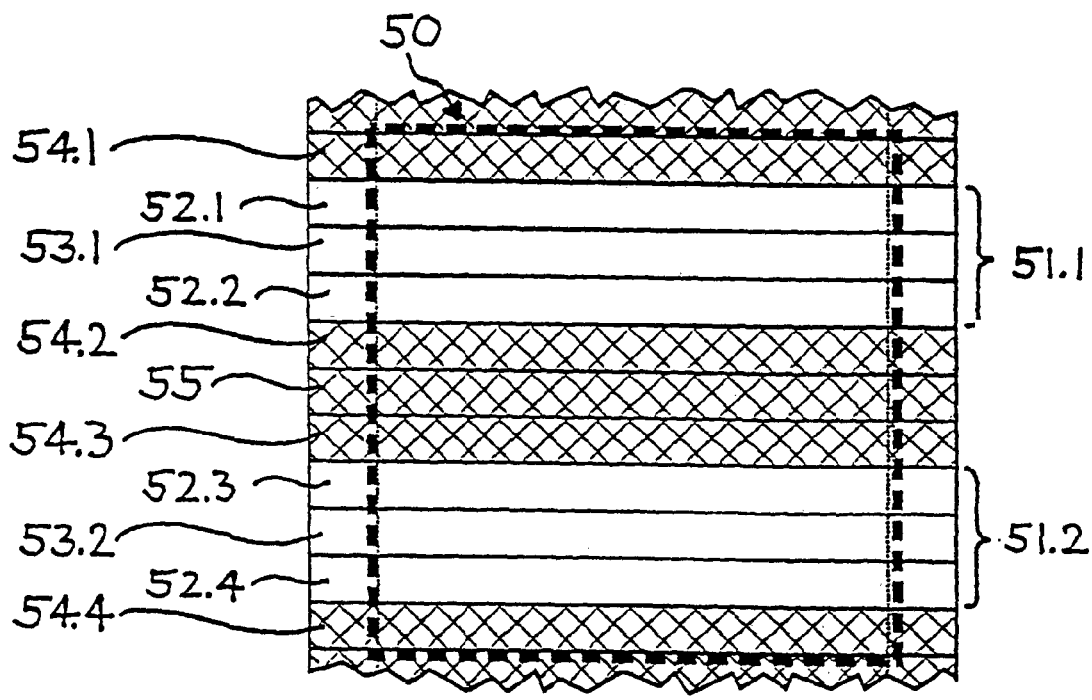
FIG. 1 shows a basic concept of a pixel of a device according to the invention.

The basic structure of an exemplified pixel 50 of a device according to the invention is illustrated in FIG. 1. The pixel 50 comprises, e.g., two light-sensitive photo sites 51.1, 51.2. A first photo site 51.1 has a first photo gate 52.1 for the phase angle 0° and a second photo gate 52.2 for the phase angle 180°; a second photo site 51.2 has a third photo gate 52.3 for the phase angle 90° and a fourth photo gate 52.4 for the phase angle 270°. Between the two photo gates 52.1, 52.2 (or 52.3, 52.4, respectively) in each photo site 51.1 (or 51.2), there is a middle photo gate 53.1 (or 53.2) which is preferably kept at a fixed potential. The pixel 50 further comprises light-protected storage gates 54.1–54.4, each of which is associated to a photo gate 52.1–52.4. A first storage gate 54.1 is for storing signals with phase angle 0°, a second storage gate 54.2 for storing signals with phase angle 180°, a third storage gate 54.3 for storing signals with phase angle 90°, and a fourth storage gate 54.4 for storing signals with phase angle 270°. The second storage gate 54.2 and the third storage gate 54.3 are isolated by a separation gate 55. All gates within one pixel 50 can be controlled separately.

In FIGS. 4–7, which show various embodiments of the invention and are discussed further below, analogous elements are designated by the same reference signs as in FIG. 1 and will not be explained again.

Figure 2:
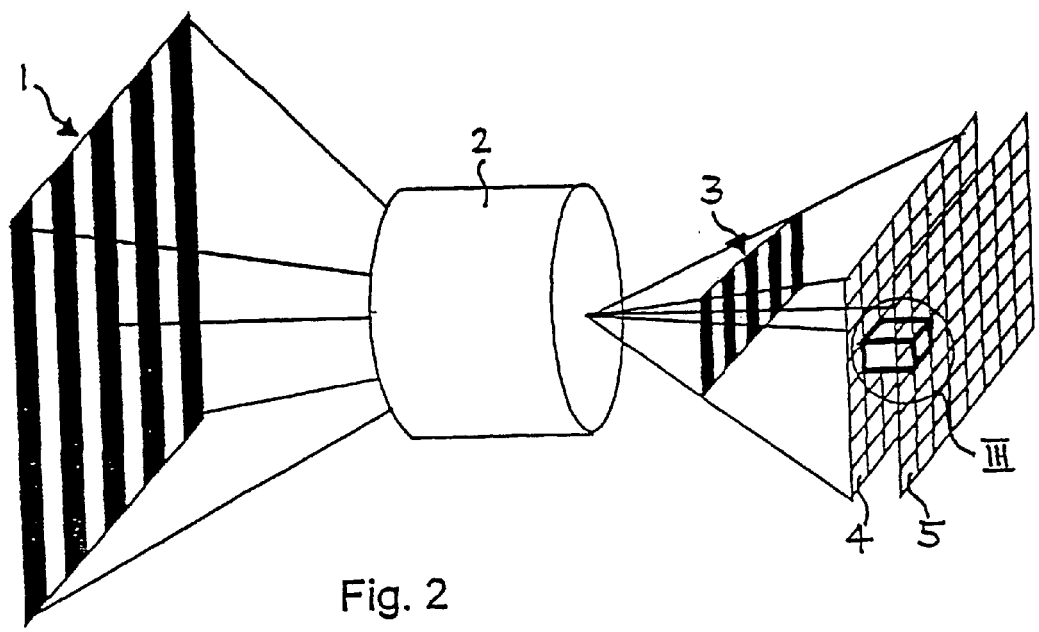
FIG. 2 shows a device according to the invention.

The device according to the invention, as schematically shown in FIG. 2, preferably comprises a standard objective 2 for imaging a scene 1, thus generating an imaged scene 3. The device further comprises a microlens array 4 and an optical application-specific integrated circuit (ASIC) 5.

Figure 3:
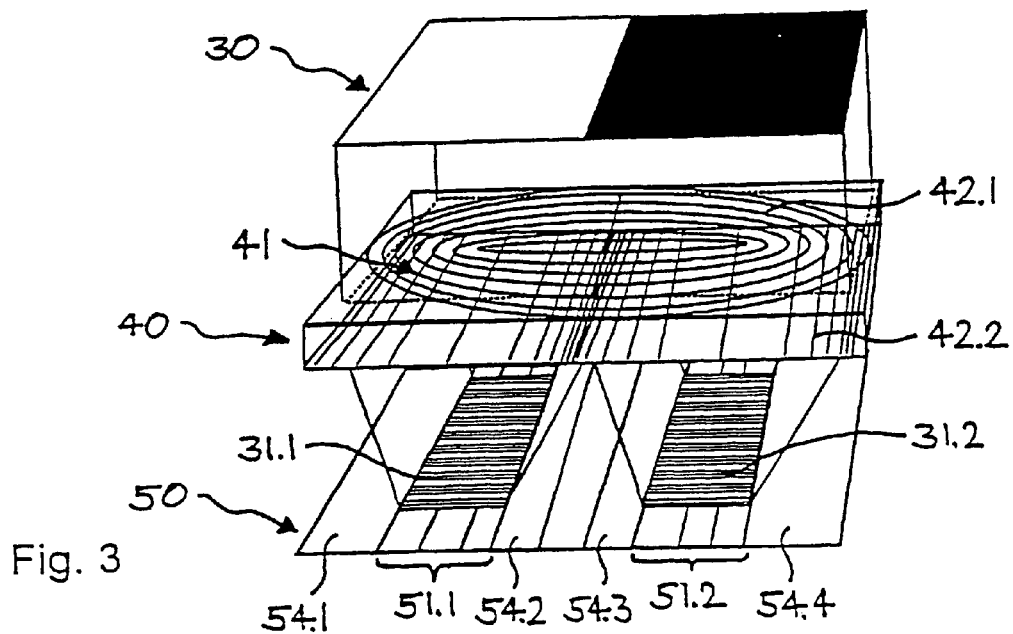
FIG. 3 shows a pixel of the device of FIG. 2 together with an associated microlens.

The details of a pixel 40 of the microlens array 4 and a pixel 50 of the opto ASIC 5 are shown in FIG. 3. Each pixel 40 of the microlens array comprises an optical microstructure 41, which can be realized, e.g., as a microlens or a plurality of microlenses, as a diffractive element, or a plurality of diffractive elements, etc. The optical microstructure 41 aims at equally distributing the averaged light intensity of an imaged-scene pixel 30 onto the two optically identical photo sites 51.1, 51.2 of the ASIC pixel 50. This is schematically illustrated in FIG. 3 by choosing an example where the area 30 of the scene allocated to the pixel 50 is partially white and partially black, and where the areas 31.1, 31.2 on the photo sites 51.1, 51.2 corresponding to this area 30 are equally gray, represented by a cross-hatching. In the schematic representation of FIG. 3, the optical microstructure 41 consists of two sub-structures 42.1, 42.2. A first sub-structure 42.1 is for averaging the intensity, and a second substructure 42.2 is for distributing the averaged intensity onto the two photo sites 51.1, 51.2.

The device according to the invention can preferably be realized in two different technologies:

(A) the pure CCD technology; and, (B) the CMOS-APS/CCD technology.

Embodiments realized in these two technologies are discussed below.

(A) Realization as a Pure CCD Imager

Figure 4:
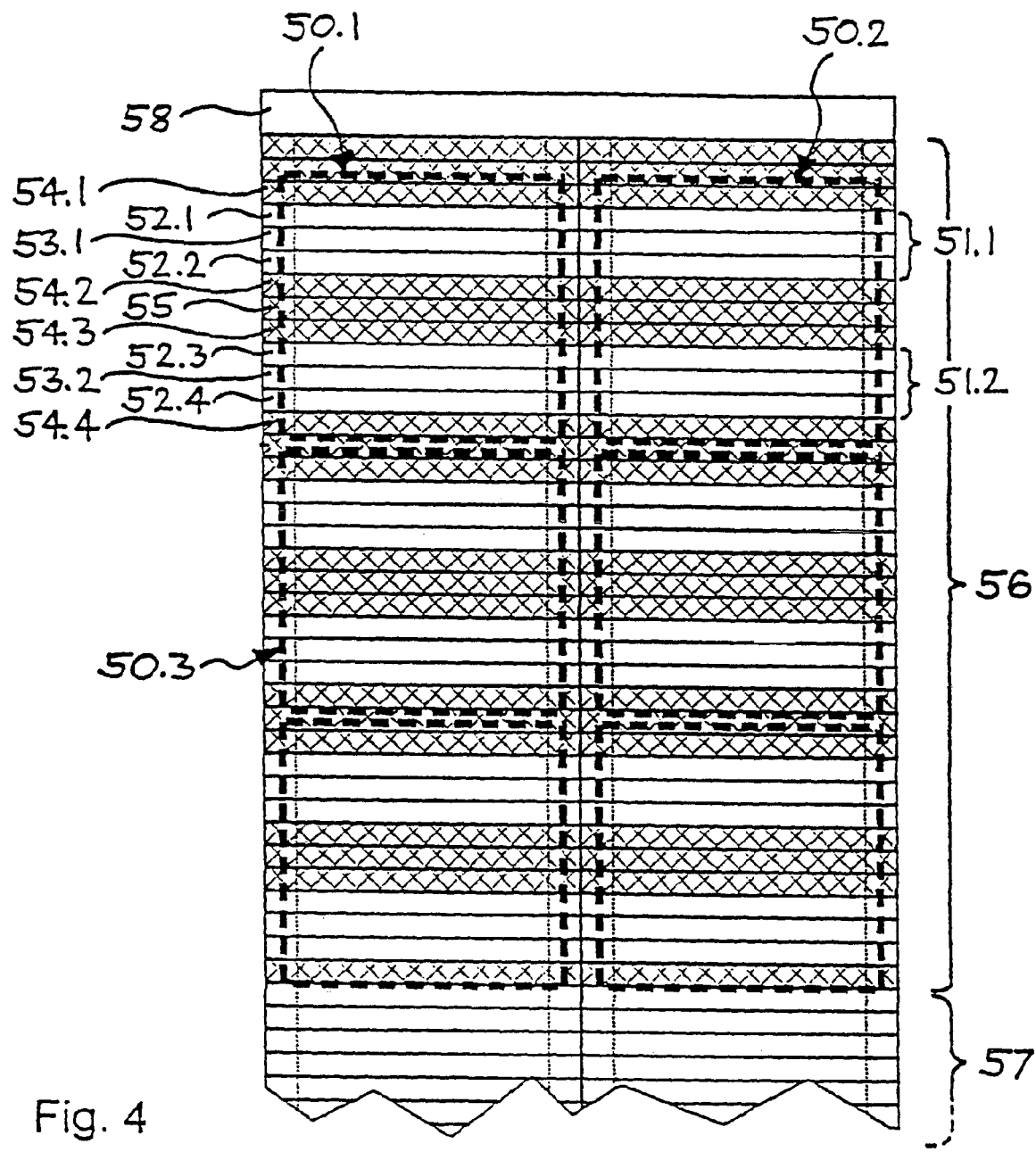
FIG. 4 shows an embodiment of the invention realized in CCD technology.

An embodiment realized in a pure CCD process is shown in FIG. 4. One pixel 50.1 (50.2, . . . ) consists of two light sensitive areas 51.1, 51.2. Each of these areas 51.1 (or 51.2, respectively) is divided into two or three light sensitive modulation gates 52.1, 52.2 (or 52.3, 52.4); here a 3-gate realization is shown with a middle photo gate 53.1 (or 53.2). During demodulation/integration operation, the middle gate 53.1 (or 53.2)—if present—is kept at a fixed potential and the outer modulation gates 52.1, 52.2 (or 52.3, 52.4) are modulated in a balanced manner. Optically generated charge carriers are then distributed to the neighboring storage gates 54.1, 54.2 (or 54.3, 54.4), depending on the actual potential gradient under the modulation gates 52.1, 52.2 (or 52.3, 52.4). The storage gates 54.1, 54.2 (or 54.3, 54.4) are isolated from each other by an additional transportation gate 55. The two modulation-gate pairs 52.1, 52.2 and 52.3, 52.4 within one pixel 50.1 are operated with a 90° phase difference with respect to each other, so that the one pair 52.1, 52.2 integrates the in-phase component and the other pair 52.3, 52.4 integrates the quadrature-phase component. Each gate within the pixel 50.1 can be controlled individually and all pixels 50.1, 50.2, . . . are operated in parallel.

The sensor is realized as a frame transfer CCD. A first, partly light-sensitive area 56 accessible to light serves as a lock-in CCD array for integration, and a second, light-protected area 57 serves as a memory CCD array for storage. The pixel gates are therefore operated like a 3-phase CCD to transfer the image into the storage CCD 57. It can then be read out protected from further optical signal distortion. During readout, the next image can be integrated. During the image transfer from the first area 56 into the second area 57, smearing may take place. This, however, does not seriously influence the measured phase result, since all sampling points belonging to one pixel 50.1 (50.2, . . . ) integrate the same parasitic offset charge. Additionally, the use of a monochromatic light source or a light source with limited spectral bandwidth in combination with narrow band-filters can efficiently reduce background illumination and, hence, smearing effects. (The active illumination can be switched "off" during the picture shift into the storage CCD 57.)

Like in conventional CCDs, anti-blooming structures can be integrated in order to prevent charge carriers of an overexposed pixel to disturb neighboring pixel information. Additionally, a charge-dump diffusion 58 on top of the first area 56 enables to get rid of parasitic charge. The dimensions of the CCD gates are preferentially chosen such that one gets square pixels 50.1, 50.2, . . . (i.e., the gates are about 12 times wider than long).

The proposed structure is an advantageous combination of the established frame-transfer-CCD principle with the new demodulation-pixel principle.

(B) Realization as a CMOS-APS/CCD Imager

The pixel can also be realized in CMOS/CCD technology with the active-pixel concept. The CMOS-APS/CCD realization seems to be more advantageous than a pure CCD realization, since each pixel can be addressed and read out individually, and blooming problems or smearing problems do not appear. Three different embodiments realized in the CMOS-APS/CCD technology are shown in FIGS. 5–7.

Figure 5:
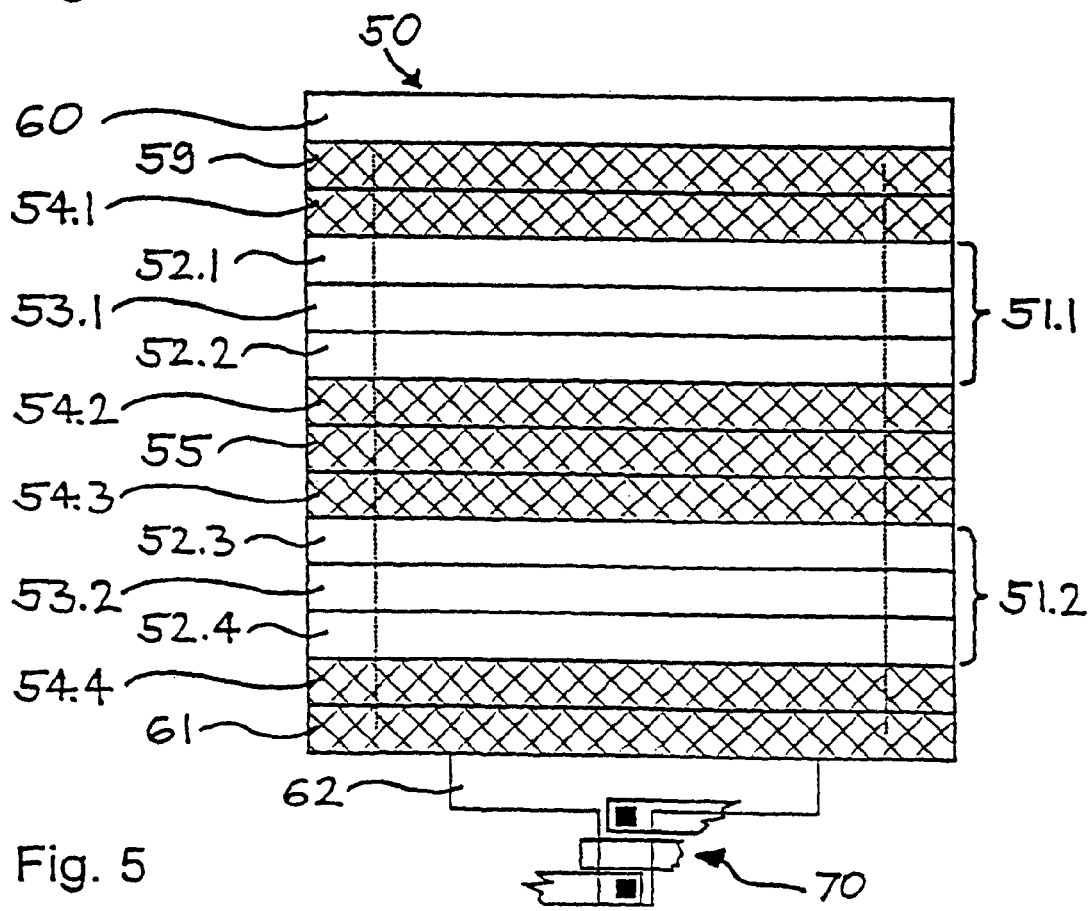

FIG. 5 shows an embodiment that has only one readout stage per pixel 50. The single sampling points can then be transferred to a readout node sequentially by operating the CCD gates like a conventional CCD line. Care has to be taken that no additional charge is optically generated during this transfer.

The pixel 50 comprises a dump gate 59 and a dump diffusion 60 for resetting, and an OUT gate 61 and a sense diffusion 62 for reading out. The pixel 50 additionally comprises an addressable in-pixel APS readout circuitry 70.

FIG. 6 and FIG. 7 show embodiments with two readout stages 70.1, 70.2 per pixel 50. Here, two sense diffusions 62.1, 62.2 (or 62.3, 62.4, respectively) are short-circuited to one sense node 63.1 (or 63.2), which can be accessed from two sides. This enables the readout of two sampling points per readout stage without moving the sampled values through the light-sensitive CCD gates. It is true that the sense diffusion 62.1–62.4 will get a larger capacitance (less than a factor two) and, hence, a worse conversion factor (voltage increase per electron); however, this drawback can be tolerated. It is important to mention that fixed-pattern noise due to the use of two readout stages 70.1, 70.2 per pixel 50 is not a problem. This is because of the subtraction of the balanced-mode sampling points in the evaluation algorithm of Eq. (3). Fixed-pattern noise mainly adds an offset component to the pixel values. This offset disappears after the subtraction. We call this "pair-wise offset-free charge integration".

In the following, various methods for operating a TOF distance-measurement system are discussed.

Figure 8:
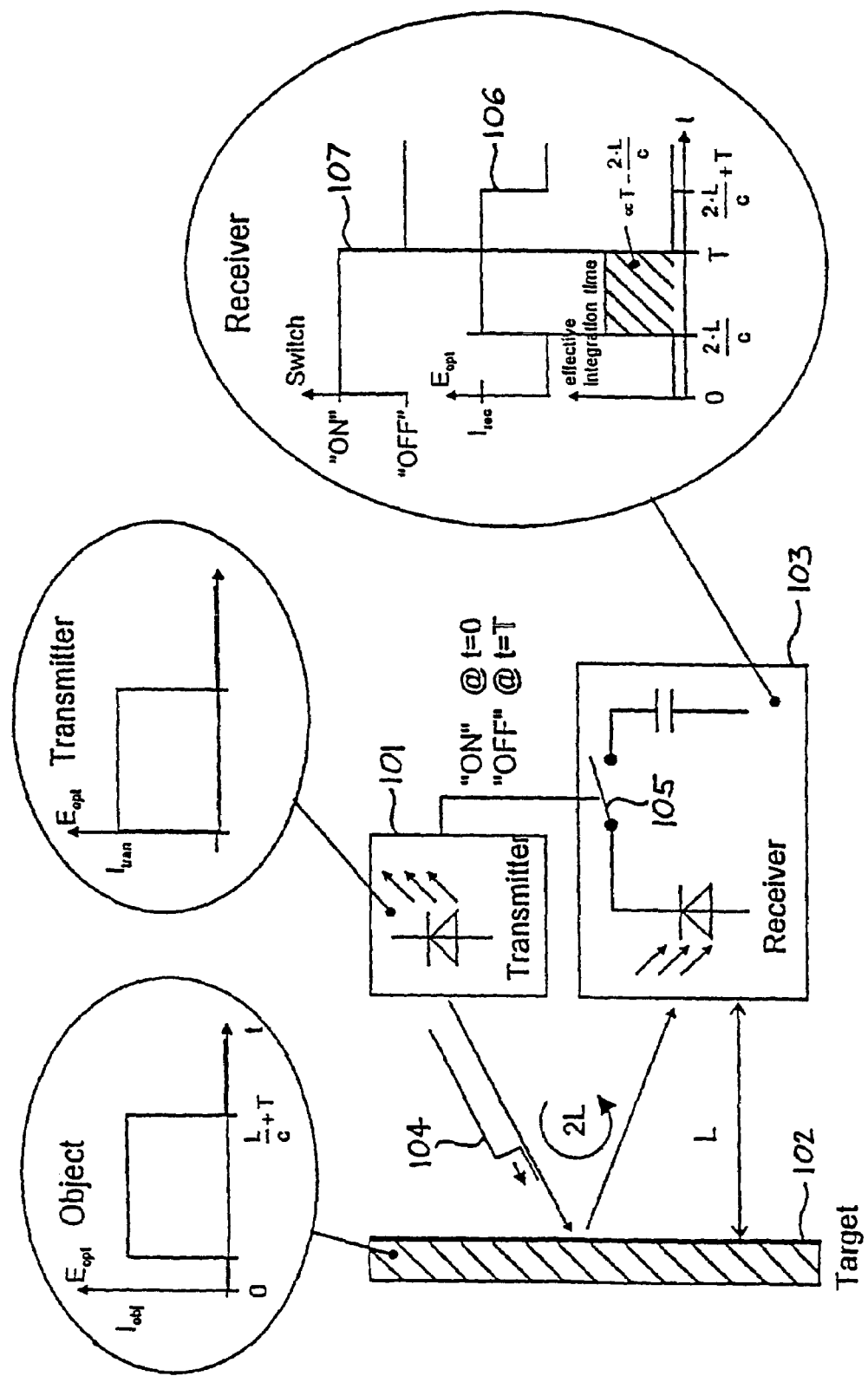
FIGS. 8 and 9 show the principle of a pulsed-TOF distance-measurement method according to the state of the art.
Figure 9:
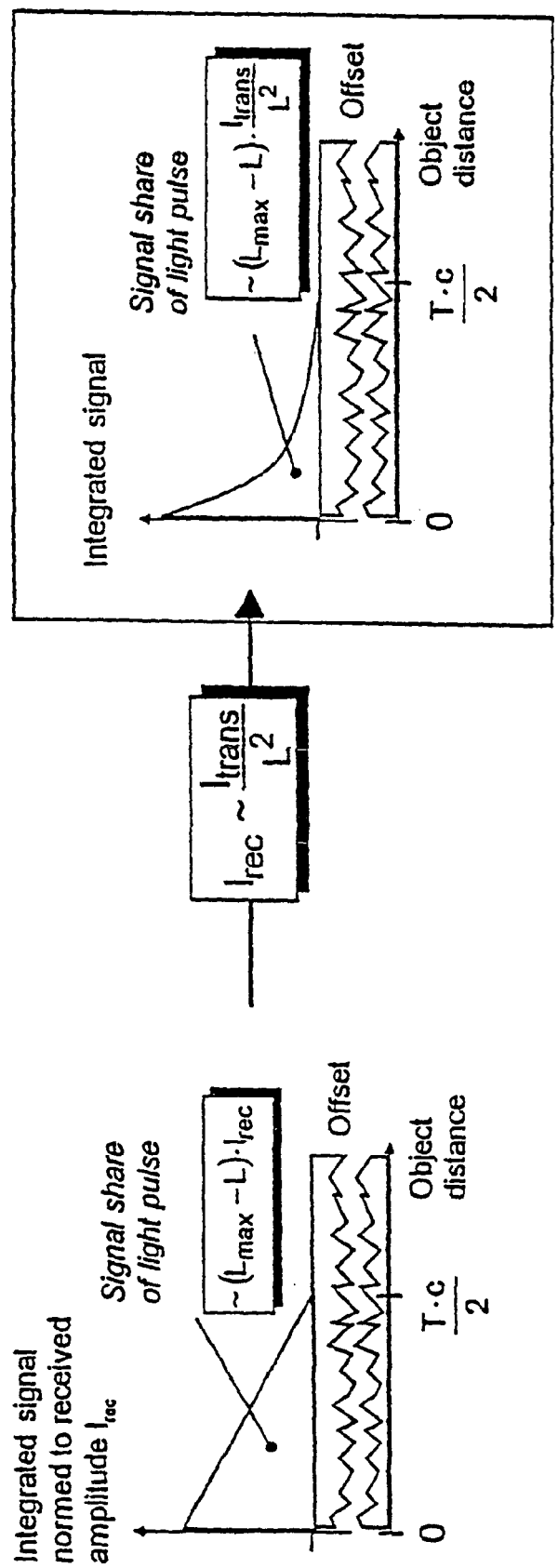

FIGS. 8 and 9 illustrate the operation principle of a TOF distance measurement system according to the state of the art. A modulated light source (or transmitter) 101 is normally located near a detector (or receiver) 103. Since the optical power density on an illuminated object or target 102 decreases with the square of the distance L between the illumination source 101 and the target 102, the received intensity $I_{rec}$ on the detector 103 also decreases with the square of the target distance L. With the transmission of a light pulse 104, a switch 105 in the receiver 103 opens. The switch 105 closes with the end of the light pulse 104. The amount of light integrated in the receiver 103 depends on the overlap of the time window 107 defined by the ON time of the switch 105 and the delayed time window 106 of ON time of the received light pulse 104. Both ON time of the switch 105 and pulse width are chosen to have the same length T. Thus, targets 102 with zero distance (L=0) receive the full amount of the light pulse 104, the complete light pulse 104 is integrated. Targets 102 farther away from the light source 101 only integrate a fraction of the light pulse 104. Only distances $L<L_{max}$ within the propagation range of the light pulse 104, defined by half the product of the pulse width T and the light velocity c, can be measured. The amount of received light $I_{rec}$ decreases with the square of the target distance L to the emitting active illumination source 101, as illustrated in FIG. 9. The prior-art shutter operation leads to an additional distance-dependent attenuation of the integrated received signal.

Figure 10:
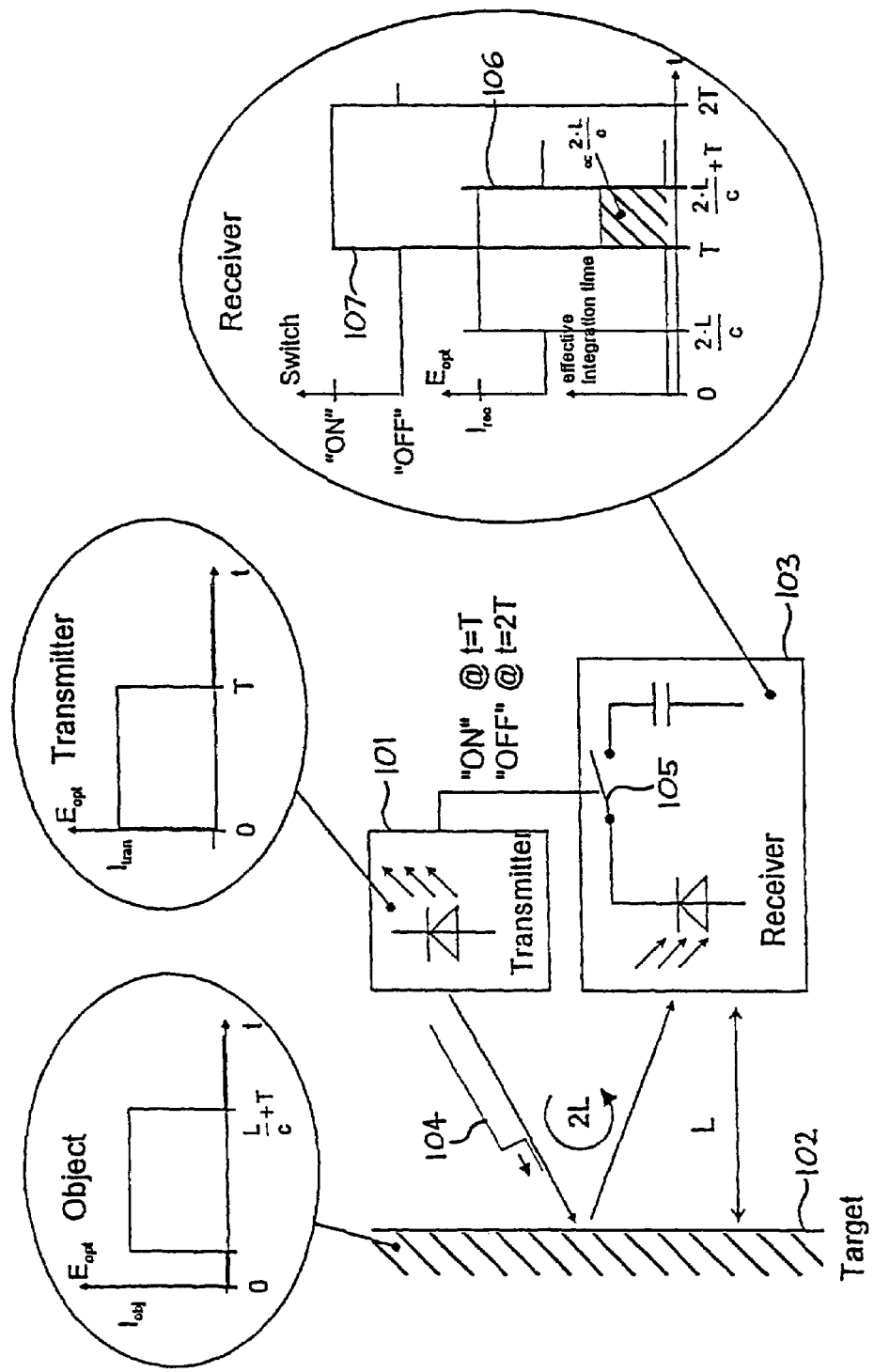
FIGS. 10 and 11 show the principle of a first embodiment of a pulsed-TOF distance-measurement method according to the invention.
Figure 11:
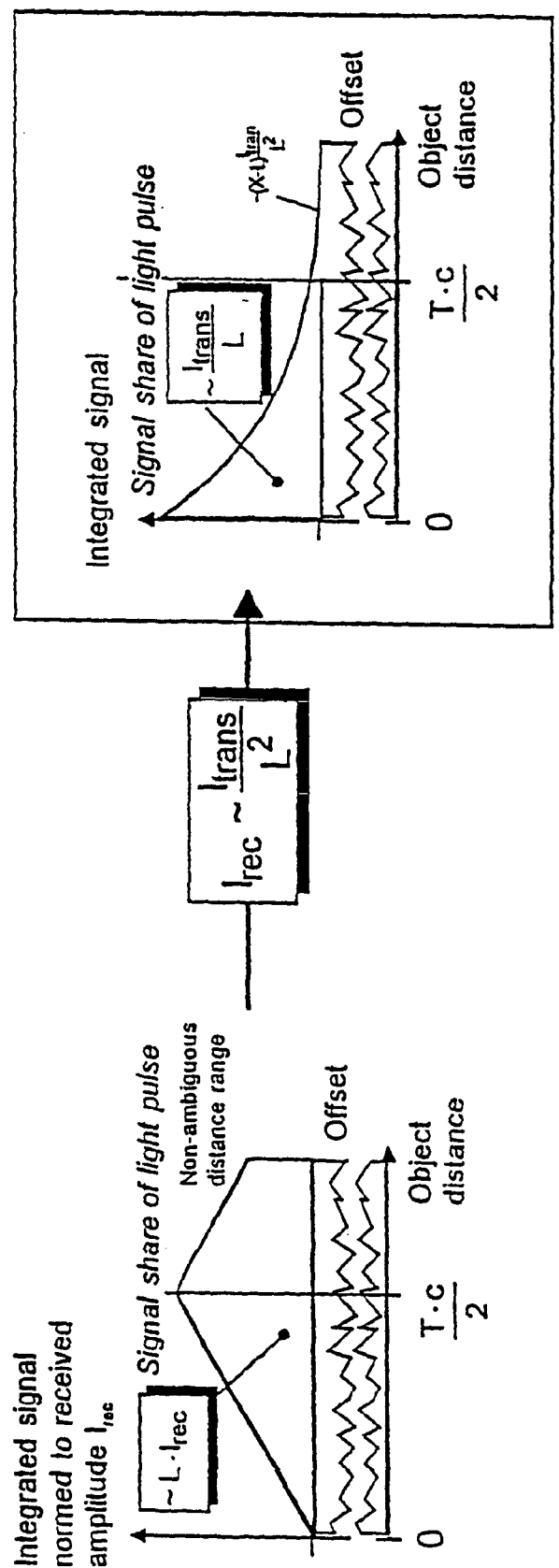

A first mode of operation according to one aspect of the invention is illustrated in FIGS. 10 and 11. According to this method, which can be called the "inverse shutter operation", the switch 105 is started at the end of the light-pulse transmission or even later. Targets 102 farther away from the range camera integrate a longer period of the light pulse 104 than targets 102 near the range camera. Together with the attenuation of the back-scattered light from a diffusely reflecting target 102, which is proportional to the square of the distance L (assuming a Lambert-reflecting target), the resulting integrated signal share of the light pulse now only decreases linearly with the distance L of the target 102 (cf. FIG. 11).

Figure 12:
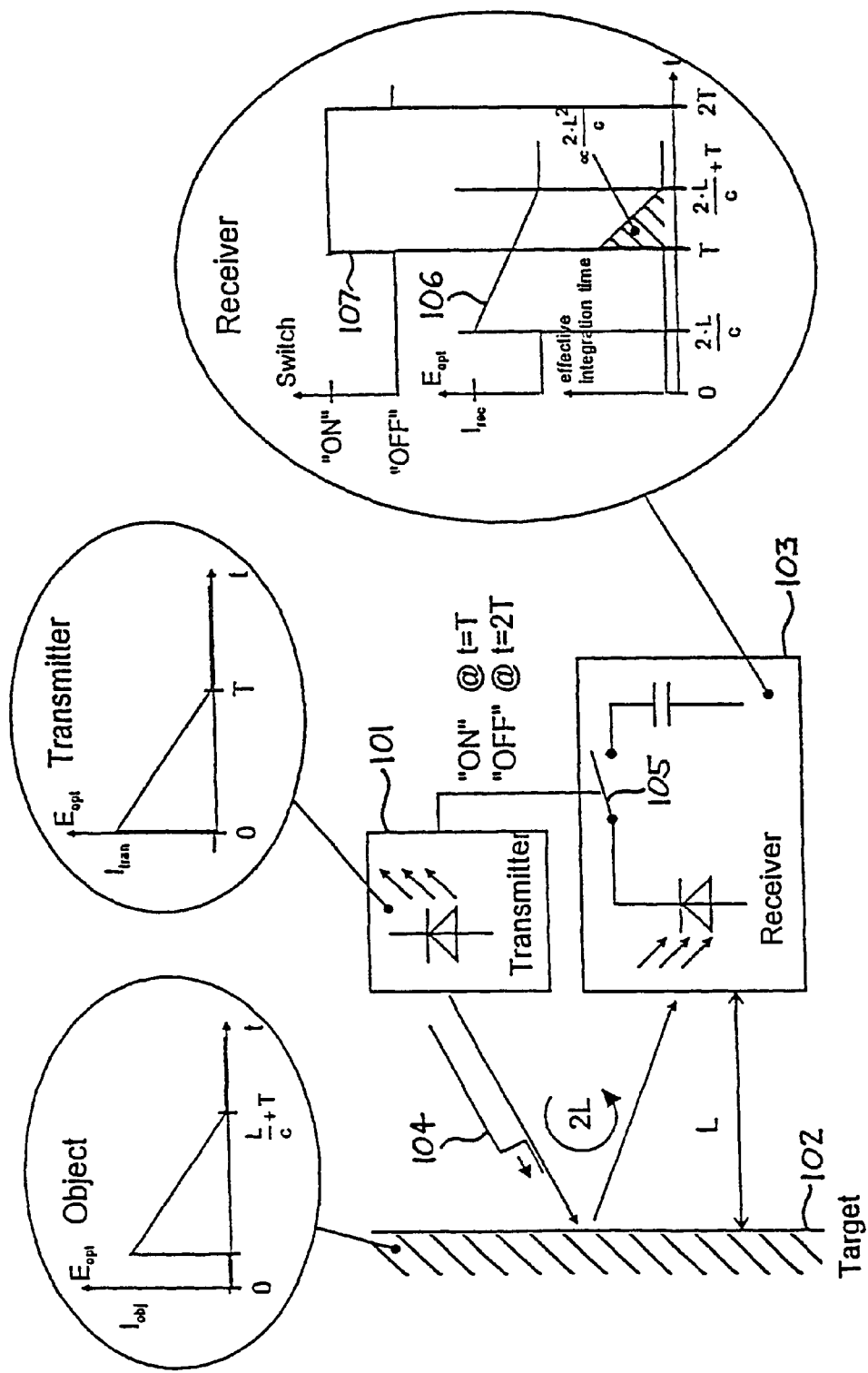
FIGS. 12 and 13 show the principle of a second embodiment of a pulsed-TOF distance-measurement method according to the invention.
Figure 13:
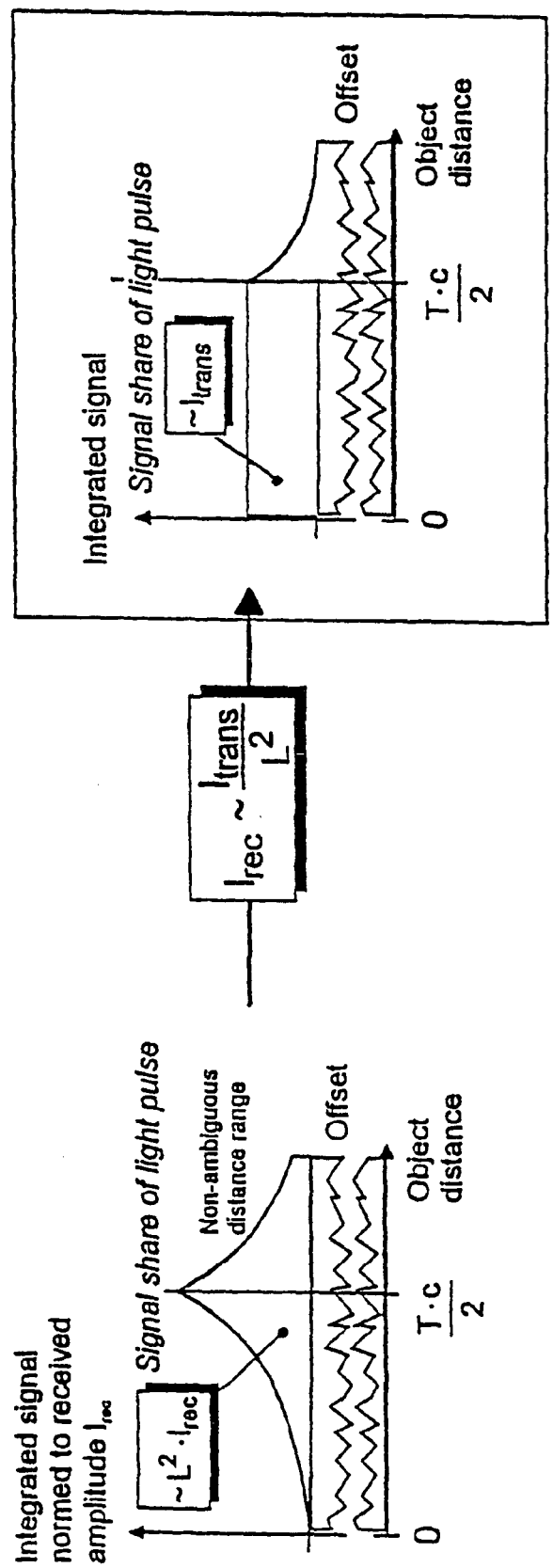

FIGS. 12 and 13 show a second mode of operation according to one aspect of the invention. This method uses a falling-ramp pulse 104 instead of a square pulse and combines this operation with the "inverse shutter operation" explained with respect to FIGS. 10 and 11. This results in an integrated signal that does not depend on the target's distance L, only on its remission coefficient, if the target 102 is a Lambert reflector.

The invention claimed is:

1. A device for spatially resolved photodetection and demodulation of temporally modulated electromagnetic waves, comprising:
   a one-dimensional or two-dimensional array of pixels (50), each pixel (50) comprising:
      at least two transducer elements (51.1, 51.2) for transducing incident electromagnetic radiation into an electric signal, each transducer element (51.1, 51.2) being associated with:
         at least one storage element (54.1–54.4) for storing said electric signal, said at least one storage element (54.1–54.4) being inaccessible or insensitive to incident electromagnetic radiation;
      wherein each pixel (50) comprises an optical element (41) for spatially averaging the electromagnetic radiation incident on the pixel (50) and equally distributing the averaged electromagnetic radiation onto said transducer elements (51.1, 51.2) of the pixel (50).

2. The device according to claim 1, wherein said optical element (41) comprises at least one of a refractive element and a diffractive optical element.

3. The device according to claim 1, wherein each pixel (50) has two transducer elements (51.1, 51.2).

4. The device according to claim 1, wherein each transducer element (51.1) is associated with two storage elements (54.1, 54.2).

5. The device according to claim 1, wherein said arrangement of pixels (50) is realized in CCD or in CMOS-APS/CCD technology.

6. A method for spatially resolved photodetection and demodulation of temporally modulated electromagnetic waves, comprising the steps of:

impinging electromagnetic radiation onto a one-dimensional or two-dimensional array of pixels (50);

spatially averaging the electromagnetic radiation incident on each pixel (50);

equally distributing the averaged electromagnetic radiation onto at least two transducer elements (51.1 51.2) of the pixel (50);

transducing the equally distributed averaged electromagnetic radiation incident on each pixel (50) into at least two electric signals in at least two transducer elements (51.1, 51.2); and, storing each of said at least two electric signals in at least one storage element (54.1–54.4).

7. The method according to claim 6, wherein said at least two transducer elements (51.1, 51.2) of a pixel (50) are operated with a 90° phase shift with respect to each other.

8. The method according to claim 6, wherein each pixel (50) is addressed and read out individually.

* * * * *

UNITED STATES PATENT AND TRADEMARK OFFICE
CERTIFICATE OF CORRECTION

PATENT NO. : 7,060,957 B2  Page 1 of 1
APPLICATION NO. : 10/258784
DATED : June 13, 2006
INVENTOR(S) : Lange et al.

It is certified that error appears in the above-identified patent and that said Letters Patent is hereby corrected as shown below:

On the Title Page, Item [73], Assignee, delete "Microtechinique" and insert --Microtechnique--

Signed and Sealed this

First Day of May, 2007

JON W. DUDAS
*Director of the United States Patent and Trademark Office*